(12) United States Patent
Basak

(10) Patent No.: US 8,490,055 B2
(45) Date of Patent: Jul. 16, 2013

(54) GENERATING DEPENDENCY MAPS FROM DEPENDENCY DATA

(75) Inventor: Indranil Basak, West Linn, OR (US)

(73) Assignee: CA, Inc., Islandia, NY (US)

( * ) Notice: Subject to any disclaimer, the term of this patent is extended or adjusted under 35 U.S.C. 154(b) by 331 days.

(21) Appl. No.: 12/885,135

(22) Filed: Sep. 17, 2010

(65) Prior Publication Data
US 2012/0072887 A1    Mar. 22, 2012

(51) Int. Cl.
*G06F 9/44*    (2006.01)

(52) U.S. Cl.
USPC .......................................................... 717/123

(58) Field of Classification Search
None
See application file for complete search history.

(56) References Cited

U.S. PATENT DOCUMENTS

| | | | |
|---|---|---|---|
| 5,485,616 A | 1/1996 | Burke et al. | |
| 5,592,600 A | 1/1997 | De Pauw et al. | |
| 6,186,677 B1 | 2/2001 | Angel et al. | |
| 6,240,549 B1 | 5/2001 | Hamada et al. | |
| 6,260,187 B1 | 7/2001 | Cirne | |
| 6,282,701 B1 | 8/2001 | Wygodny et al. | |
| 6,338,159 B1 | 1/2002 | Alexander, III et al. | |
| 6,584,501 B1 | 6/2003 | Cartsonis et al. | |
| 6,792,460 B2 | 9/2004 | Oulu et al. | |
| 6,857,120 B1 | 2/2005 | Arnold et al. | |
| 6,996,806 B2 | 2/2006 | Bates et al. | |
| 7,003,781 B1 | 2/2006 | Blackwell et al. | |
| 7,203,624 B2 | 4/2007 | Warshawsky | |
| 7,281,170 B2 | 10/2007 | Taylor et al. | |
| 7,310,777 B2 | 12/2007 | Cirne | |
| 7,310,780 B2 | 12/2007 | Diering et al. | |
| 7,350,107 B2 | 3/2008 | Thaler et al. | |
| 7,505,953 B2 | 3/2009 | Doshi | |
| 7,509,632 B2 | 3/2009 | Boger | |
| 7,558,847 B2 | 7/2009 | Strassner | |
| 7,590,715 B1 | 9/2009 | Raanan | |
| 7,607,169 B1 | 10/2009 | Njemanze et al. | |
| 7,668,953 B1 | 2/2010 | Sinclair et al. | |
| 7,681,182 B1 | 3/2010 | Mistry et al. | |
| 7,904,892 B2 * | 3/2011 | Babb et al. | 717/144 |
| 8,135,739 B2 | 3/2012 | Karidi et al. | |
| 2002/0062237 A1 | 5/2002 | Matsumoto et al. | |
| 2002/0173997 A1 | 11/2002 | Menard et al. | |
| 2003/0056199 A1 | 3/2003 | Li et al. | |
| 2003/0084018 A1 | 5/2003 | Chintalapati et al. | |
| 2004/0039728 A1 | 2/2004 | Fenlon et al. | |

(Continued)

OTHER PUBLICATIONS

U.S. Appl. No. 13/082,710, filed Apr. 8, 2011.

(Continued)

*Primary Examiner* — Philip Wang
(74) *Attorney, Agent, or Firm* — Vierra Magen Marcus LLP

(57) ABSTRACT

Disclosed herein are techniques for generating data that describes dependencies between software components as transactions are processed, as well as displaying dependency maps based on the data. The data may be collected by agents that monitor or trace transactions being processed by the software components. The collected data may be aggregated to form a directed graph that describes the dependencies between the software components. A dependency map may be displayed based on the directed graph. The dependency map may show dependencies between software components as the transactions are processed. The dependency map may also show dependencies between applications that include the software components. The dependency map(s) may allow a user to easily and quickly ascertain where a problem is occurring. For example, the user might be able to quickly determine that a problem is at a backend database, as opposed to an application server at a frontend.

26 Claims, 11 Drawing Sheets

U.S. PATENT DOCUMENTS

| | | | |
|---|---|---|---|
| 2004/0064543 A1 | 4/2004 | Ashutosh et al. | |
| 2004/0075690 A1 | 4/2004 | Cirne | |
| 2004/0078691 A1* | 4/2004 | Cirne et al. | 714/38 |
| 2005/0120273 A1 | 6/2005 | Hudson et al. | |
| 2005/0131927 A1 | 6/2005 | Fildebrandt et al. | |
| 2005/0210454 A1 | 9/2005 | DeWitt, Jr. et al. | |
| 2006/0004802 A1 | 1/2006 | Phillips et al. | |
| 2006/0036726 A1 | 2/2006 | Fabbio et al. | |
| 2007/0043861 A1 | 2/2007 | Baron et al. | |
| 2007/0263541 A1 | 11/2007 | Cobb et al. | |
| 2007/0266149 A1 | 11/2007 | Cobb et al. | |
| 2007/0288633 A1 | 12/2007 | Mullarkey | |
| 2008/0059625 A1 | 3/2008 | Barnett et al. | |
| 2009/0019428 A1 | 1/2009 | Li et al. | |
| 2009/0028053 A1 | 1/2009 | Kannan et al. | |
| 2009/0112667 A1* | 4/2009 | Blackwell et al. | 705/7 |
| 2009/0144305 A1* | 6/2009 | Little | 707/101 |
| 2009/0177509 A1 | 7/2009 | David et al. | |
| 2010/0063785 A1* | 3/2010 | Pich et al. | 703/6 |
| 2010/0145945 A1 | 6/2010 | Episale et al. | |
| 2010/0169331 A1 | 7/2010 | Karidi et al. | |
| 2010/0275054 A1 | 10/2010 | Grace et al. | |
| 2012/0072887 A1* | 3/2012 | Basak | 717/123 |
| 2012/0259793 A1 | 10/2012 | Umansky et al. | |
| 2012/0260135 A1 | 10/2012 | Beck et al. | |

OTHER PUBLICATIONS

U.S. Appl. No. 13/082,723, filed Apr. 8, 2011.
U.S. Appl. No. 13/082,737, filed Apr. 8, 2011.
U.S. Appl. No. 13/082,741, filed Apr. 8, 2011.
Extended European Search Report dated Dec. 19, 2011, European Patent Application No. 11250805.6, 6 pages.
Response to Office Action dated Sep. 21, 2012, European Patent Application No. 11250805.6, 16 pages.
Extended European Search Report dated Sep. 24, 2012, European Patent Application No. 12163427.3, 9 pages.
Office Action dated Oct. 18, 2012, U.S. Appl. No. 13/082,737, filed Apr. 8, 2011, 29 pages.
Office Action dated Oct. 22, 2012, U.S. Appl. No. 13/082,723, filed Apr. 8, 2011, 48 pages.
Extended European Search Report dated Jun. 28, 2012, European Patent Application No. 12163435.6.
Extended European Search Report dated Jul. 16, 2012, European Patent Application No. 12163454.7.
Extended European Search Report dated Jun. 25, 2012, European Application No. 12163428.1, filed Apr. 5, 2012, 6 pages.
Response to Office Action dated Jan. 17, 2013, U.S. Appl. No. 13/082,737, filed Apr. 8, 2011, 14 pages.
Response to Office Action dated Jan. 22, 2013, U.S. Appl. No. 13/082,723, filed Apr. 8, 2011, 18 pages.
Notice of Allowance and Fee(s) Due dated Feb. 27, 2013, U.S. Appl. No. 13/082,737, filed Apr. 8, 2011, 14 pages.
Office Action dated Mar. 7, 2013, U.S. Appl. No. 13/082,723, filed Apr. 8, 2011, 16 pages.
European Office Action dated Apr. 4, 2013, European Application No. 11250805.6 filed Sep. 15, 2011, 8 pages.
Response to Extended European Search Report dated Apr. 10, 2013, European Application No. 12163428.1 filed Apr. 5, 2012, 11 pages.
Response to Extended European Search Report dated Apr. 10, 2013, European Application No. 12163435.6 filed Apr. 5, 2012, 10 pages.
Response to Extended European Search Report dated Apr. 10, 2013, European Application No. 12163454.7 filed Apr. 5, 2012, 10 pages.
Response to Extended European Search Report dated Apr. 23, 2013, European Application No. 12163427.3 filed Apr. 5, 2012, 3 pages.
Notice of Allowance and Fee(s) Due dated May 22, 2013, U.S. Appl. No. 13/082,723, filed Apr. 8, 2011, 16 pages.

* cited by examiner

US 8,490,055 B2

GENERATING DEPENDENCY MAPS FROM DEPENDENCY DATA

BACKGROUND OF THE INVENTION

1. Field

The present disclosure is directed to technology for monitoring software in a computing environment.

2. Background

The growing presence of the Internet as well as other computer networks such as intranets and extranets has brought many new applications in e-commerce, education and other areas. Organizations increasingly rely on such applications to carry out their business or other objectives, and devote considerable resources to ensuring that they perform as expected. To this end, various application management techniques have been developed.

One approach involves monitoring the infrastructure of the application by collecting application runtime data regarding the individual software components that are invoked in the application. This approach can use agents that essentially live in the system being monitored. For example, using instrumentation of the software, a thread or process can be traced to identify each component that is invoked, as well as to obtain runtime data such as the execution time of each component. Tracing refers to obtaining a detailed record, or trace, of the steps a computer program executes. Traces can be used as an aid in debugging.

Typically, some type of report is presented to the user based on the results of tracing. This information should be presented to the user in an easily understanding manner. If the information is too detailed, it can be difficult for the user to determine exactly where the problem is. Even if not too detailed, the information might not provide for quick visualization of the problem. For example, the tracing information may collect data from software applications that run on different computing devices. In some cases, different entities are responsible for maintaining the different software applications. For example, one entity might maintain a web server application that receives user requests, whereas a different entity might maintain a backend database. It can be useful for the user to be able to quickly ascertain whether the problem (e.g., slow execution) is happening at the web server or backend database such that the proper entity may be contacted.

DETAILED DESCRIPTION

Disclosed herein are techniques for generating data that describes dependencies between software components as transactions are processed, as well as displaying dependency maps based on the data. The data may be collected by agents that monitor or trace transactions being processed by the software components. The collected data may be aggregated to form a directed graph that describes the dependencies between the software components. A dependency map may be displayed based on the directed graph. The dependency map could show dependencies between software components as the transactions are processed. The dependency map may also show dependencies between applications that include the software components. The dependency map(s) may allow a user to easily and quickly ascertain where a problem is occurring. For example, the user might be able to quickly determine that a problem is at a backend database, as opposed to an application server at a frontend.

Figure 1:
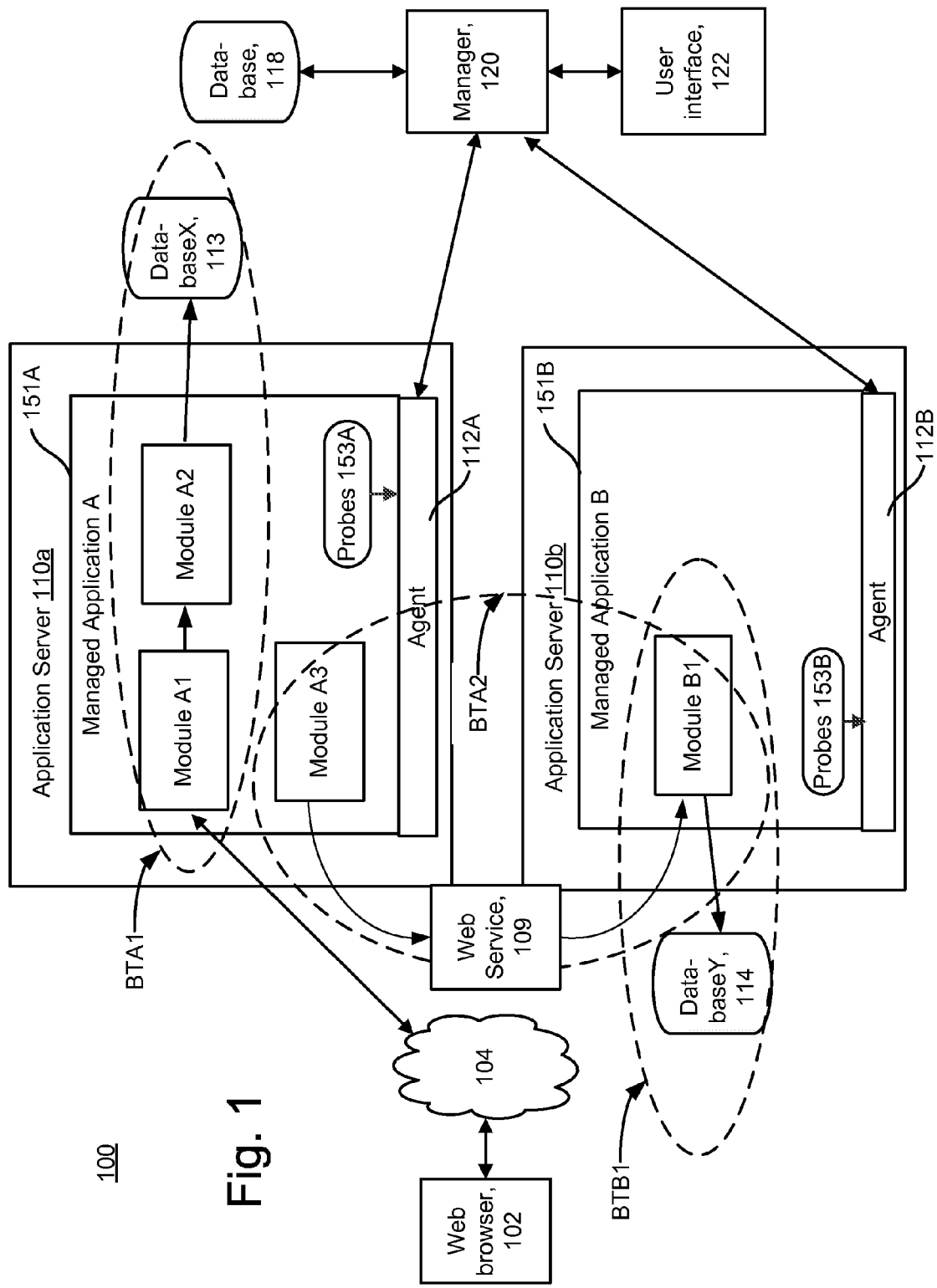
FIG. 1 depicts a system which includes a managed application.

FIG. 1 depicts a network 100 in which different computer systems provide data to a manager. Example computer systems may include application servers 110a, 110b or any other type of computer system having a processor for executing code to achieve a desired functionality. The application servers 110 can run different applications, or separate instances of the same application. The application servers 110 can be located remotely from one another or co-located. The application servers 110 communicate with a manager computer 120, in this example. The Manager 120 could be local or remote from the application servers 110.

For example, a corporation running an enterprise application such as a web-based e-commerce application may employ a number of application servers at one location for load balancing. Requests from users, such as from an example web browser 102 of a user, are received via the network 104 such as the Internet, and can be routed to any of the application servers 110. The web browser 102 typically accesses the network cloud 104 via an Internet Service Provider, not shown.

Application servers 110a, 110b include managed application A 151A and managed application B 151B, which includes agents 112A, 112B and example probes 153A, 153B. There may be any number of probes. The distinction between elements having a letter in the reference numeral (e.g., application servers 110a, 110b) is made for purposes of discussion. Herein, the use of reference numerals without an "a," or "b," indicates that no particular server or other element is being referred to. Application 151 can be a Java® application or a different type of application. Thus, agent software running on the application servers 110, denoted by Agent 112, gather information from a managed application 151, middleware or other software, running on the application servers 110, in one possible approach. For example, information from the application 151 can also be obtained using probes 153. In practice, many such probes can be used to obtain information regarding different components of the application 151. In some embodiments, the probes may be added to the application 151 using instrumentation, one example of which is byte code instrumentation. However, the gathered data may be obtained in other ways as well. The agents 112 essentially live in the computer system being monitored and provide a data acquisition point. The agents organize and optimize the data communicated to the manager 120.

For purposes describing transaction flows, software components that process transactions are depicted in the managed applications 151. The software components could include any piece of code (e.g., module) within a managed application 151 or any piece of code outside of a managed application. For example, the software components within the managed application 151 could include, but are not limited to, Servlets, plain old Java objects (POJOs), Enterprise JavaBeans® (EJB®), sockets, etc. Software components outside the managed application 151 may include those that the managed application 151 interacts with; however, direct interaction is not required. Software components outside the managed application 151 could include, but are not limited to, databases, web services, web browsers, etc.

Three transactions are depicted in FIG. 1. Transaction BTA1 may be initiated in response to an HTTP request from the web browser 102, as one example. For transaction BTA1, the flow is from module A1 to module A2 to DatabaseX 113. Note that there may actually be many more software components involved with transaction BTA1. However, not all of the software components may be of interest to a user. For example, there might be one or more software components along the transaction between module A1 and module A2. Also, there might be one or more components along the transaction between module A2 and DatabaseX 113. For example, there might be a socket between module A2 and DatabaseX 113. However, the socket might not be of interest to the user. For transaction BTA2, the flow is from module A3 to Web Service 109 to module B1. The flow from module B1 to DatabaseY 114 could also be considered to be part of transaction BTA2 if, for example, it was caused by the call from module A3 to module B1. The transaction BTA2 generates a transaction BTB1 with respect to ApplicationB. Specifically, the flow for transaction BTB1 is from module B1 to DatabaseY 114.

For the sake of discussion, transaction BTA1 might be a "Buy Transaction," that allows a user (at web browser 102) to buy a book or some other item. For the sake of discussion, transaction BTA2 might be a "Check Credit Transaction," that authorizes the use of a credit card for purchasing the book. Note that over time there may be many different instances of transaction BTA, as different users visit the website. Thus, transaction BTA1 may be referred to as a "type of transaction," for which there may be many instances.

In some embodiments, the agents 112 collect data that describes dependencies between the software components as transactions are processed and supply that data to the manager 120. The manager 120 may aggregate that data to form a directed graph ("digraph") that represents dependencies between the software components as the software components process the transactions. For example, the digraph may have vertices that represent the components and edges that represent the dependencies between the components. A dependency map may then be displayed on a display screen such as user interface 122 based on the digraph. The dependency map shows dependencies as the transactions are processed. The dependency map can have various levels of detail. For example, it might show dependencies between the software components. However, the dependency map could be more general and show dependencies between the applications 151 (perhaps not even showing the software components). Following are a few example dependency maps for purposes of illustration. These maps correspond to the example transactions processed by the system 100 of FIG. 1.

Figure 2:
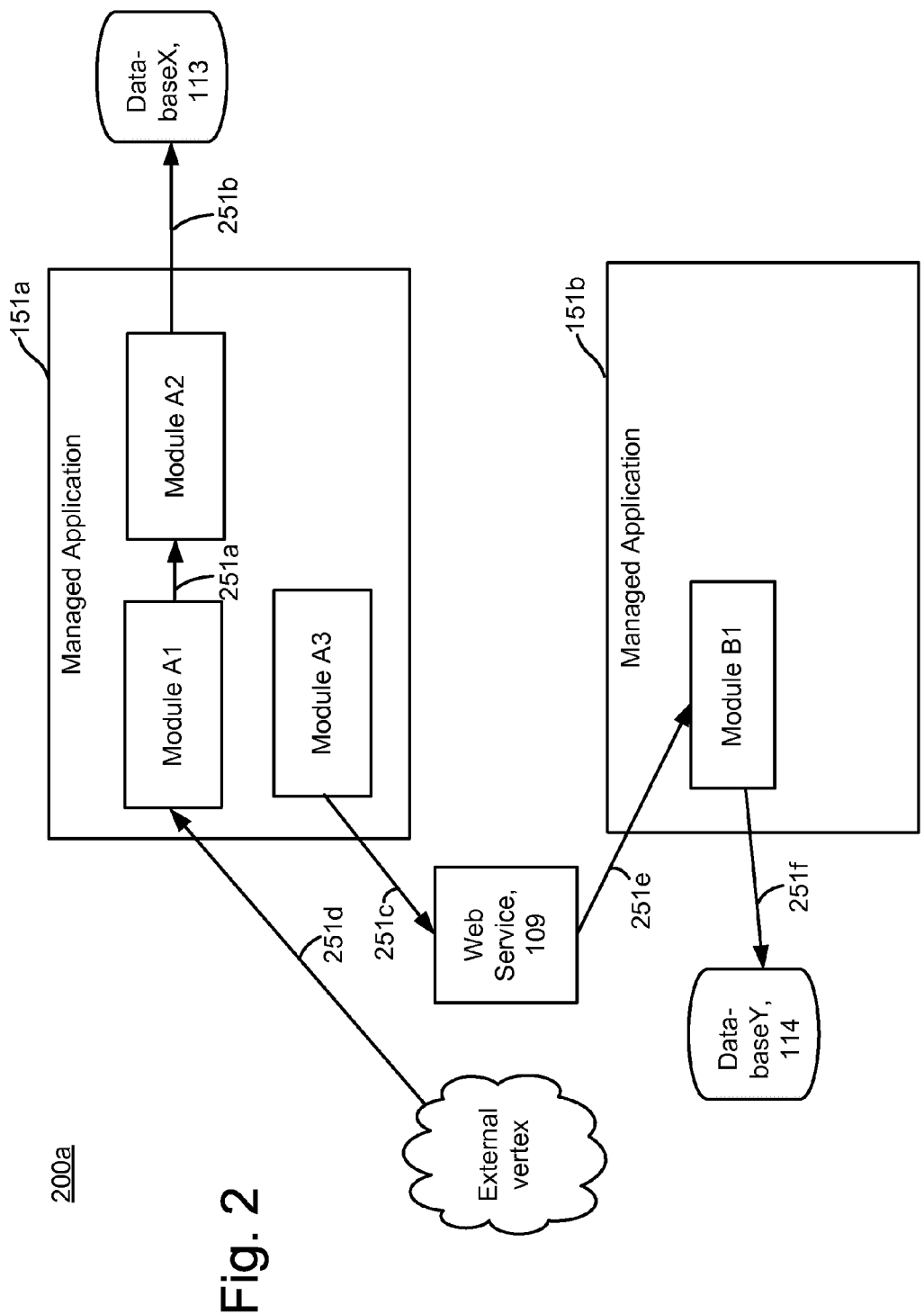
FIG. 2, FIG. 3 and FIG. 4 depict examples of dependency maps that could be presented on a display screen.

FIG. 2 depicts one example of a dependency map 200a that could be presented on a display screen (such as user interface 122). The example dependency map 200a may show dependencies between software components of system 100 when processing transactions. In this example, the dependency map 200a pertains to transactions processed by Application A. This dependency map 200a could be displayed in response to a user request for detailed dependency map for managed Application A 151A. The transactions BTA1 and BTA2 may be considered to be part of managed Application A's dependency map. Both the transactions may be combined together to form one dependency map for Application A. For example, the dependency between Module A1, Module A2, and databaseX 113 is represented by the arrows connecting those components. Note this corresponds to transaction BTA1. The dependency between Module A3, web service 109, module B1, and databaseY 114 is represented by the arrows connecting those elements. Note this corresponds to transaction BTA2. Another possibility is to show fewer details for managed application B 151b, since the user only requested details for Application A. For example, module B1 and/or database Y 114 might not be depicted. Instead there might just be an arrow from web service 109 to managed application B 151b.

The dependency map 200 may include vertices and edges. A vertex may correspond to a software component. For example, in FIG. 2, vertexes could be "external vertex," module A1, module A2, module A3, DatabaseX, web service, module B1, and Database Y. Note that, in some cases, managed Application A and Managed Application B could be a vertex. Also note that the term "external vertex" is being used to refer to one type of vertex that is outside of the application server. In this case, the external vertex represents some software component that sent an HTTP request to managed application A 151A. Note that the user might not be interested in exactly which software component sent the HTTP request. Therefore, using the generic term "external vertex" may provide sufficient description.

Several edges 251a-251f are labeled in FIG. 2. An edge represents a dependency between a pair of software components. In general, an edge may be described as an ordered pair of two software components. Edges are represented as arrows in FIG. 2. The tail and head of the arrow may be used to define the order of the software components in the ordered pair. For example, edge 251a may be described as (module A1, module A2). Edge 251b may be described as (module A2, Database X).

Figure 3:
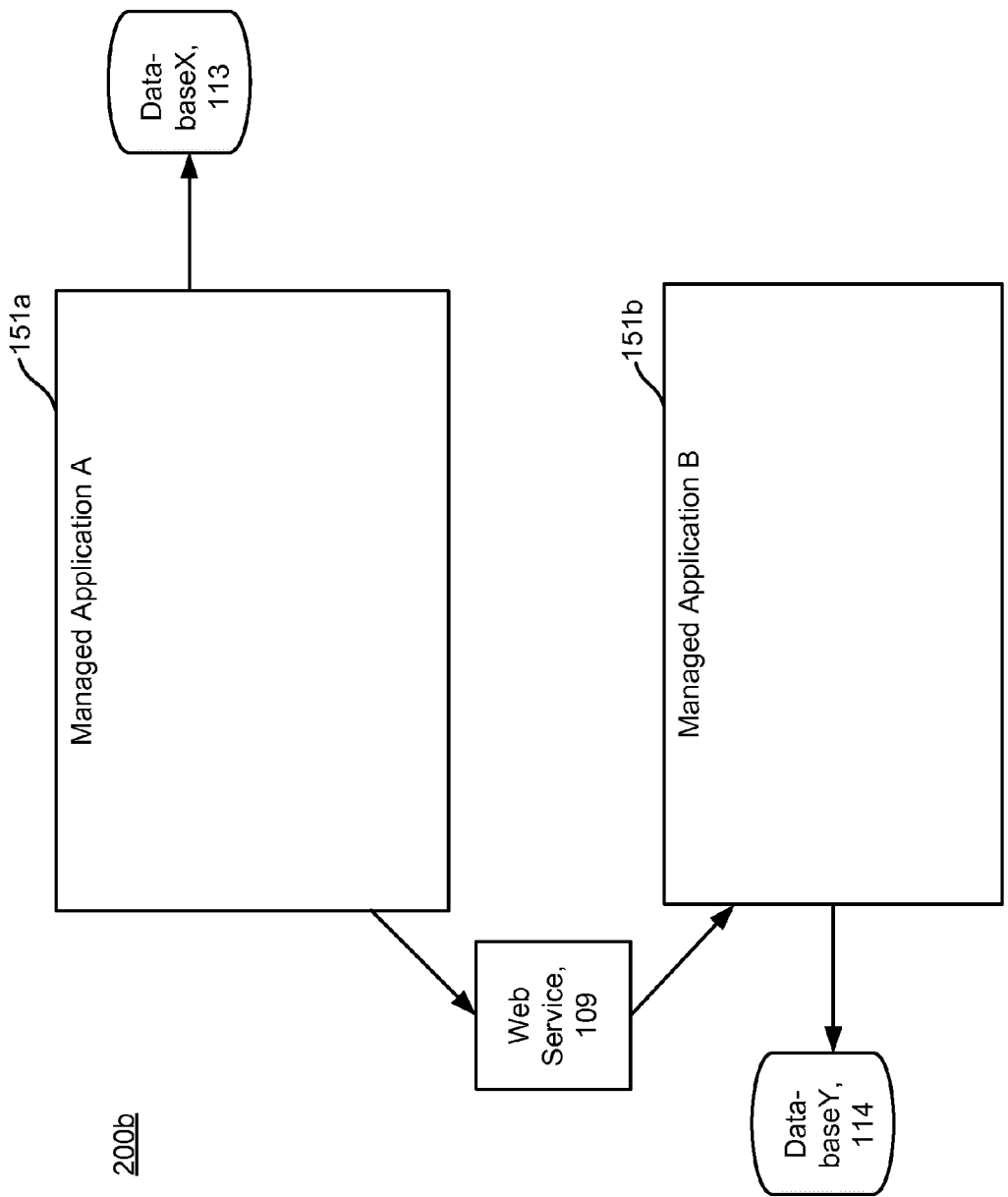

In one embodiment, the dependency map 200 may include a higher level summary than show in FIG. 2. A more detailed view of an application may become complicated if there are a large number of applications and/or software components. FIG. 3 depicts one example of a summary dependency map 200b that could be presented on a display screen. This example is a higher level summary than the example of FIG. 2 and is a summary of Application A. In this example, dependencies between managed Application A 151a, managed Application B 151a, Database X 113, and Database Y 114 are shown for transactions BTA1 and BTA2. Note that software components within the managed applications 151 are not depicted. However, the dependency map 200b may have been generated from the same data collected by the agents 112 that was used for the dependency map 200a of FIG. 2.

Figure 4:
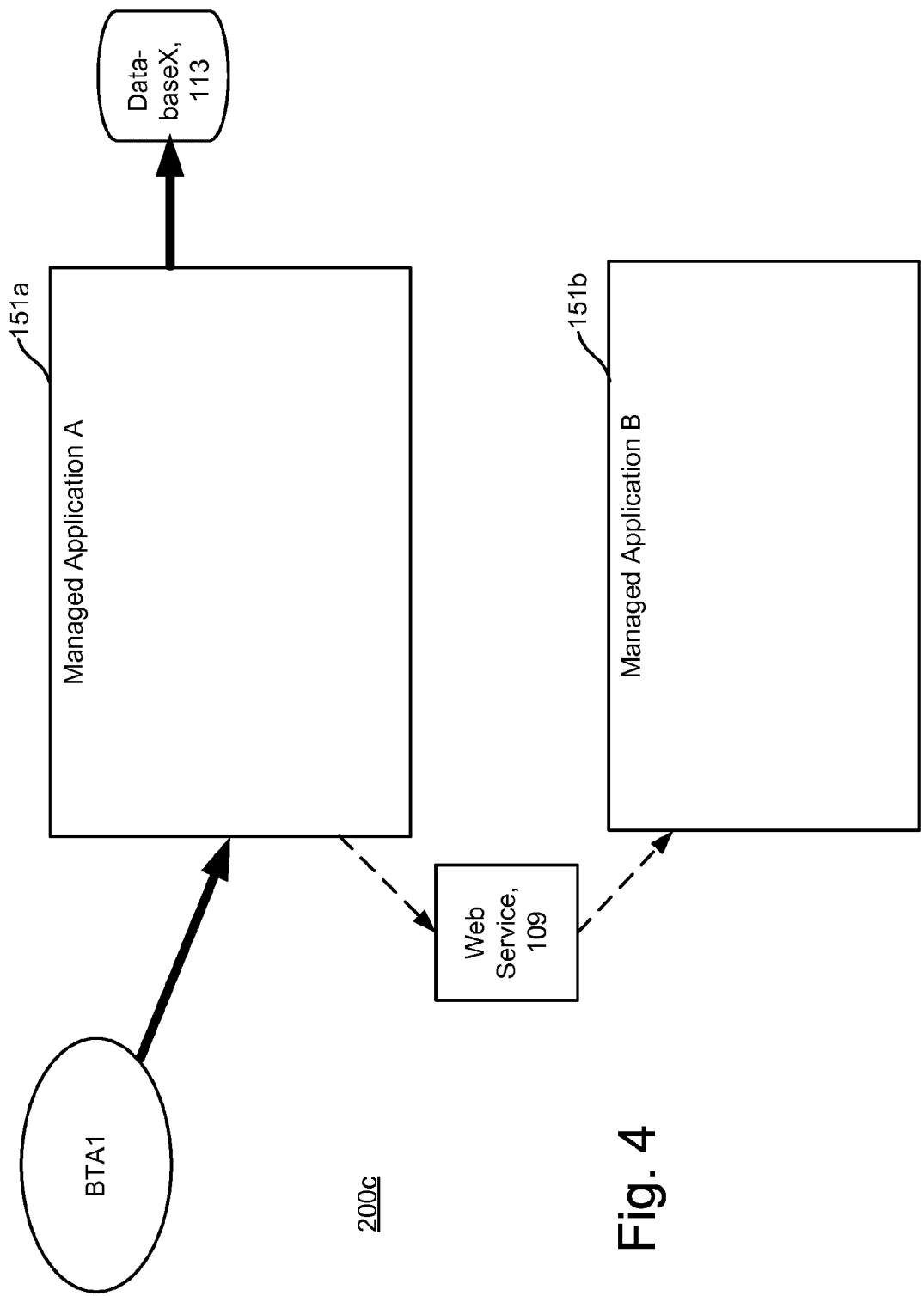

A dependency map 200 could also be directed to a certain transaction, instead of an managed application as in the previous example. FIG. 4 shows one example which shows a summary for transaction BTA1. Such a dependency map 200c may be presented in response to a user request for a dependency map for transaction BTA1. The summary view of business transactions displays the flow of transactions. In this example, only the edges that are a part of the transaction BTA1 are highlighted (bold, solid arrows). Other edges are dashed to indicate that they are not a part of transaction BTA1. For example, edges (ApplicationA, WebService) and (WebService, ApplicationB) are not part of BTA1; however, they are still displayed but not highlighted. The edges (BTA1, ApplicationA) and (ApplicationA, DatabaseX) are highlighted for being part of BTA1. Since ApplicationB is not a part of BTA1, the edge (ApplicationB, DatabaseX) is not displayed.

A summary view of other transactions such as BTA2 might also be displayed. Still another possibility is to display a dependency map 200 for a Business Service, which may be composed of several Transactions interacting with each other to accomplish a common shared goal. As one example, BTA1 and BTA2 may be part of the same Business Service. The summary of a Business Service may be the union of all vertices and edges included in BTA1 and BTA2.

Returning again to the discussion of FIG. 1, in one embodiment, a probe builder (not shown in FIG. 1) instruments (e.g., modifies) bytecode for managed applications 151 to add the probes 153 and additional code. The probes 153 may measure specific pieces of information regarding the managed applications 151 without changing the applications' business logic. One type of probe measures the amount of time that a component spent executing. The amount of time could include the time spent executing by components invoked by the component having the probe, but that is not required. The probe 153 may have a begin point at an entry point of the component and an end point at each exit of the component. In one embodiment, the begin point starts a timer and the end point stops the timer. A probe 153 may collect other information besides timing information.

The probe builder may also add agent 112 which may be installed on the same machine as applications 151 or a separate machine. Once the probes 153 have been installed in the application 151, or a monitoring capability has otherwise been provided, the application is referred to as a managed application. More information about instrumenting bytecode can be found in U.S. Pat. No. 6,260,187, "System For Modifying Object Oriented Code" by Lewis K. Cirne, and U.S. patent application Ser. No. 09/795,901, "Adding Functionality To Existing Code At Exits," filed on Feb. 28, 2001, each of which is incorporated herein by reference in its entirety.

As managed application 151 runs, probes 153 send data to agent 112. For example, the information from the probes may indicate performance data such as start and stop times of a transaction or other execution flow, or of individual components within a transaction/execution flow. In one embodiment, probes 153 may be implemented in objects and other code that write data, change data or otherwise cause the state of an application server to change. This data may be referred to as application runtime data. The Agent 122 may also collect dependency data that describes dependencies between components as transactions are processed. Agent 112 then collects, summarizes and sends the application runtime data and the dependency data to Manager 120. In response, Manager 120 runs requested calculations, makes application runtime data available to user interface 112 and, optionally, sends the application runtime data to database 118 for later analysis. Manager 120 may also aggregate the dependency data to form a digraph and display one or more dependency maps based on the digraph. More information regarding monitoring an application using probes can be found in U.S. Patent App. Pub. No. 2004/0075690, published Apr. 22, 2004, titled, "User Interface For Viewing Performance Information About Transactions", by Lewis K. Cirne, incorporated herein by reference.

Manager 120 can be provided on a separate computer system such as a workstation which communicates with a user interface 122, such as a monitor, to display information based on data received from the agents. Manager 120 can also access a database 118 to store the data received from the agents. In the example provided, the application servers can communicate with Manager 120 without accessing the network 104. For example, the communication may occur via a local area network. In other designs, Manager 120 can receive data from the agents of a number of application servers via the network 104. For instance, some large organizations employ a central network operations center where one or more managers obtain data from a number of distributed agents at different geographic locations. To illustrate, a web-based e-commerce enterprise might obtain agent data from servers at different geographic locations that receive customer orders, from servers that process payments, from servers at warehouses for tracking inventory and conveying orders, and so forth. Manager 120 and user interface display 122 might be provided at a corporate headquarters location. Other applications which are not necessarily web-based or involve retail or other sales, can similarly employ agents and managers for managing their systems. For example, a bank may use an application for processing checks and credit accounts. Moreover, in addition to the multi-computer system arrangements mentioned, a single computer system can be monitored as well with one or more agents.

Figure 5A:
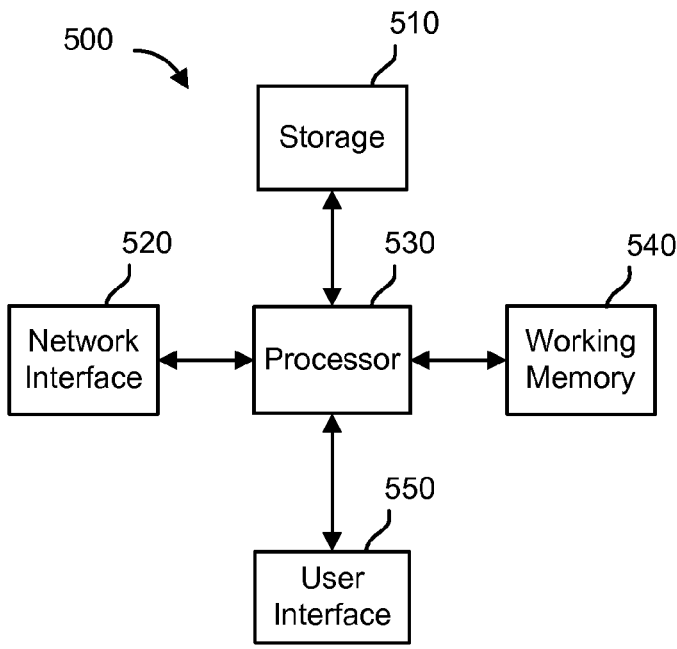
FIG. 5A depicts one embodiment of a computer system that may be used in the network of FIG. 1.

FIG. 5A depicts one embodiment of a computer system that may be used in the network of FIG. 1. The computer system 500 is a simplified representation of a system which might be used as the web browser 102, host (such as application servers 110), Manager 120 and/or user interface 122, such as discussed in connection with FIG. 1. The computer system 500 includes a storage device 510 such as a hard disk or portable media, a network interface 520 for communicating with other computer systems, a processor 530 for executing software instructions, a working memory 540 such as RAM for storing the software instructions after they are loaded from the storage device 510, for instance, and a user interface display 550. The storage device 510 may be considered to be a processor readable storage device having processor readable code embodied thereon for programming the processor 530 to perform methods for providing the functionality discussed herein. The user interface display 550 can provide information to a human operator based on the data received from one or more agents. The user interface display 550 can use any known display scheme, whether graphical, tabular or the like. In addition to an on-screen display, an output such as a hard copy such from a printer can be provided.

Further, the functionality described herein may be implemented using hardware, software or a combination of both hardware and software. For software, one or more processor readable storage devices having processor readable code stored thereon for programming one or more processors may be used. The processor readable storage devices can include computer readable storage such as volatile and nonvolatile media, removable and non-removable media. For example, computer readable storage may include volatile and nonvolatile, removable and non-removable media implemented in any method or technology for storage of information such as computer readable instructions, data structures, program modules or other data. Examples of computer readable storage include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. In alternative embodiments, some or all of the software can be replaced by dedicated hardware including custom integrated circuits, gate arrays, FPGAs, PLDs, and special purpose processors. In one embodiment, software (stored on a storage device) implementing one or more embodiments is used to program one or more processors. The one or more processors can be in communication with one or more computer readable storage devices, peripherals and/or communication interfaces.

Figure 5B:
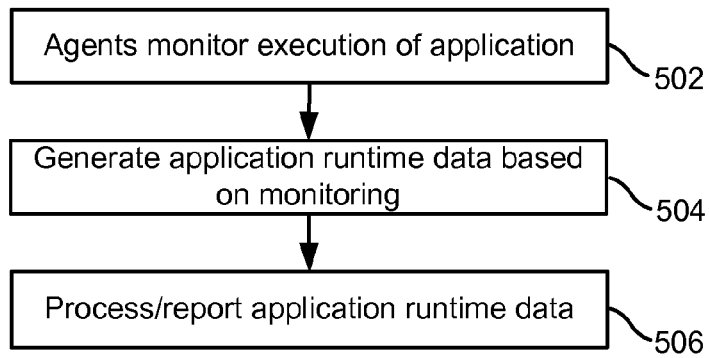
FIG. 5B illustrates a flowchart of an embodiment of a process of monitoring applications.

In some embodiments, the agents 112 monitor the applications 151 and transfer application runtime data to Manager 120, where the data is analyzed and reported to user. FIG. 5B illustrates a flowchart of an embodiment of a process of monitoring applications 151. The process may be performed in the example system 100 of FIG. 1. An application 151 is monitored by agents 152 at step 502. Monitoring may involve agents 112 determining which transactions of application server 110 are processed and the duration for which they are invoked when the application processes a client request. Monitoring may also involve agents 112 determining dependency data as components process transactions. Some examples of dependency data are discussed below. Step 502 may include probes in the application 151 executing to collect data.

Application runtime data based on the monitoring of the application is generated at step 504. The generated application runtime data can indicate the application components involved in processing a request, the duration that each component consumed in processing a request, and other information. The application runtime data can be generated by agent 112, based on data that results from execution of the probes, after which the agent 112 may forward the generated application runtime data to Manager 120. Generally, application runtime data can include information such as average component (e.g., method) execution time, a component invocation rate per second or per interval, a count of component invocations, a concurrency metric indicating number of component invocations that have started but not finished per interval, and a stalled metric indicating a number of component invocations that have started whose component invocation times have exceeded a specific threshold per interval. Further, application runtime data can identify a garbage collection heap size, a bandwidth metric indicating file and socket activity, a number of threads, system logs, exceptions, memory leaks and component interactions. Note that the application runtime data may be linked to particular transactions being processed by the managed application 151.

The application runtime data may be processed and reported by Manager 120 at step 506 such as by aggregating the data, storing the data, and providing the data to an operator through an interface or other user interface 112.

Figure 6:
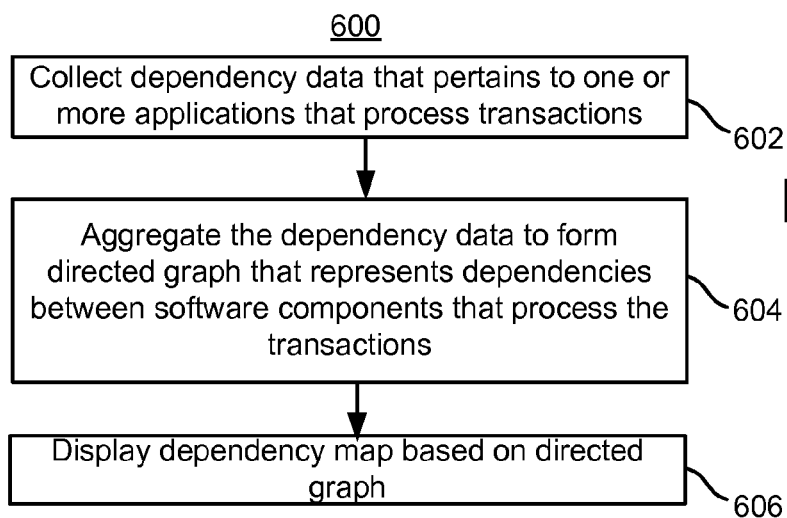
FIG. 6 is a flowchart depicting one embodiment of a process for displaying a dependency map based on a digraph.

FIG. 6 is a flowchart depicting one embodiment of a process 600 for displaying a dependency map 200 based on a digraph. Process 600 may be used in a system such as system 100. FIGS. 2-4 show a few example dependency maps 200 that might be displayed using process 600. In step 602, dependency data is collected. The dependency data may be collected by agents 112. In one embodiment, the dependency data includes vertex data that describes software components and edge data that describes dependencies between the software components.

Note that the dependency data may include data for many different instances of a managed application 151 (e.g., Managed Application A 151A). For example, the system 100 might have a number of servers that each run a different instance of Managed Application A 151A. In some cases, a single server might run different instances of Managed Application A 151A. Similar factors may apply to Managed Application B 151B. Also note that there may be many different instances of a particular type of transaction. As noted above, there may be many different instances of transaction BTA1, which might correspond to different users making a purchase. Thus, the dependency data may include data for many different instances of each type of transaction. Further details of one embodiment of step 602 are discussed below.

In step 604, the dependency data is aggregated to form a directed graph that represents dependencies between software components that process the transactions. In some embodiments, the directed graph includes vertices that correspond to various software components (e.g., servlets, EJB, device drivers, DBMS, sockets, etc.), as well as edges between pairs of the software components. Aggregating the dependency data may involve looking for duplicate vertices in the dependency data and generating a single "logical vertex" to represent the duplicate data for software components. Likewise, aggregating the dependency data may involve looking for duplicate edges in the dependency data and generating a single "logical edge" to represent the duplicate data for dependencies between the software components. Further details of one embodiment of step 604 are discussed below.

In step 606, a dependency map 200 is displayed based on the directed graph. Several examples are shown in FIGS. 2-4. Note that the dependency map 200 may reduce some of the complexity of the directed graph. For example, not all of the vertices in the directed graph need to be displayed in the dependency map 200. Likewise, not all of the edges in the directed graph need to be displayed in the dependency map. As one particular example, a summary of the managed applications 151 could be displayed without showing components inside of managed applications 151.

Figure 7:
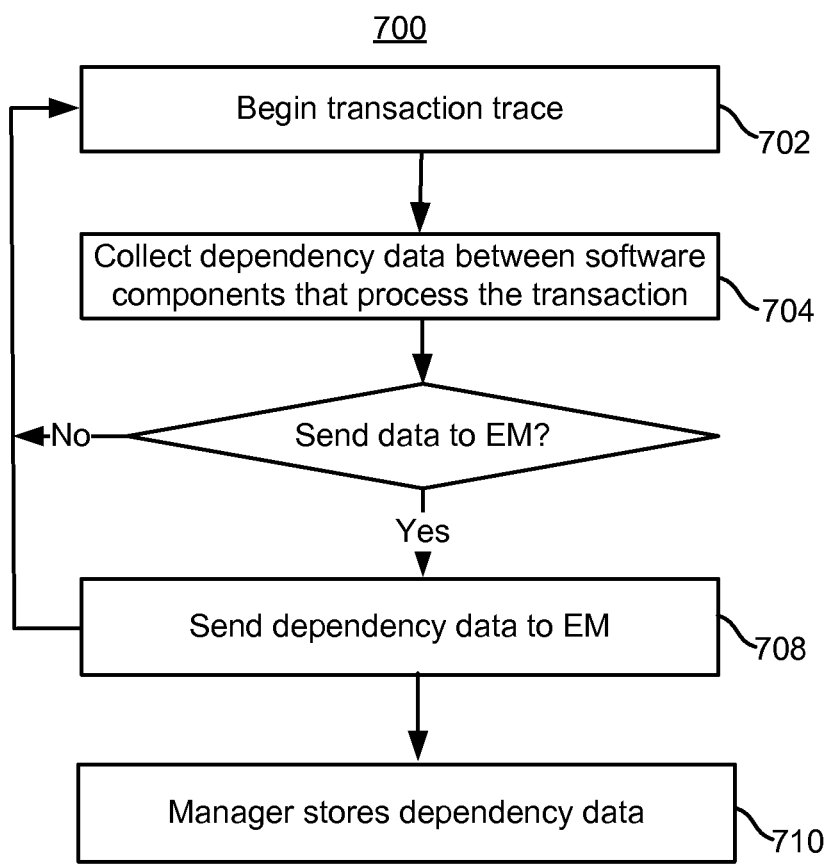
FIG. 7 is a flowchart that depicts one embodiment of a process of collecting dependency data.

FIG. 7 is a flowchart that depicts one embodiment of a process 700 of collecting dependency data. Process 700 is one embodiment of step 602 of process 600. In step 702, a transaction trace has begun. In one embodiment, a transaction trace begins when certain software components are identified as the first element in the transaction calling stack. These software components may be ones that have at some point been identified as being of interest. In some embodiments, the transaction trace captures boundaries of the transaction. The lower limit of the boundary may be defined by the first interesting element in the call stack. An interesting element can be pre-defined by specifying a type of component, such as a Servlet, that is considered interesting, as one example. In one embodiment, the upper boundary may be controlled by transactional calls outside the JVM (Java Virtual Machine). The lower boundary in the stack may be termed the Frontend, while the upper boundary may be termed the Backend. Referring to FIG. 1 as one example, module A1 might be a Frontend and module A2 might be a Backend.

In step 704, one or more agents 112 collect dependency data that represents dependencies between the software components that process the transaction. For example, the dependency data may include an edge between the Frontend and the Backend. Referring to transaction BTA1 in FIG. 1, the arrow between module A1 and module A2 could be such an edge. A starting edge may also be created between an external entity and the Frontend vertex. Referring to FIG. 1, the network 104 (or web browser 102) could be considered to be an external vertex. One reason for referring to the network 104 as an "external vertex" is that it may be outside of a virtual machine (e.g., JVM) on application server 110a. Thus, the starting edge would be between network 104 and module A1. There may also be an edge between module A2 and DatabaseX 113. Note that more than one agent could collect the dependency data for a single transaction. For example, agents 112a and 112b might both collect data for transaction BTA2.

In step 706, the agent 112 determines whether the dependency data should be provided to the Manager 120. The dependency data may be provided at any time and with any frequency. The dependency data may be provided in response to a request from Manager 120 or without a request. If the dependency data is not to be provided to the Manager 120, process 700 returns to step 702 to begin a trace of another transaction. Tracing another transaction could be tracing a different instance of transaction BTA1 or tracing a different type of transaction (e.g., BTA2)

At some point, the dependency data is sent from the agent 112 to Manager 120 (step 708). As noted, the dependency data may describe edges and vertices. In step 710, Manager 120 stores the dependency data. In one embodiment, the Manager 120 adds an arrival timestamp to the dependency data. In one embodiment, the agent 112 adds a collection timestamp (e.g., time the dependency data was collected) to the data prior to sending to Manager 120. Note that Manager 120 may receive dependency data from many agents 112. This data from the different agents 112 may be combined.

As noted above, Agents 112 may collect dependency data and send it to Manager 120. Table 1 shows an example of dependency data that could be collected for vertices. As noted, vertices may correspond to software components. In this example, each vertex has a set of "vertex properties."

TABLE 1

| Vertex Property | Description |
| --- | --- |
| Type | The type of software component. Examples include, but are not limited to, Starting Node, Servlet, EJB, etc. A user may be able to create custom types. |
| Name limited | The name of the software component. Examples include, but are not to, class name, interface name, class-method name, database, URL, etc. |
| Agent Name | The name of the Agent where the software component resides (e.g., Agent that collected the data). |
| Hierarchy Level | The hierarchy may be Class, Class-Method, etc. This property may create a parent child relationship between vertices. |
| Abstraction Level | Some vertices may be labeled as external. |
| Update Time | The time at which the vertex was last updated. |

For the type property, a starting node may be a component at the start of a transaction. The starting node could be inside the application server 110 or external to the server 110. An abstraction level of "external vertex" may be given to at least some components that are outside of the application server 110. In one embodiment, components that call the managed application 151 from outside are "external vertices." However, external components at the backend, such as databases, are not required to be considered external vertices.

Table 2 shows an example of the types of dependency data that could be collected for edges. As noted, edge data may pertain to dependencies between software components (or vertices) as transactions are processed. In this example, each edge has a set of "edge properties."

TABLE 2

| Edge Property | Description |
| --- | --- |
| Head Vertex | The vertex at the end (head of arrow point to). |
| Tail Vertex | The vertex at the start (tail of arrow touches). |
| Owner | The name of the Application or Business Transaction that owns the edge. |
| Head Owner | Application that owns the head vertex/software |

TABLE 2-continued

| Edge Property | Description |
| --- | --- |
| | component. |
| Tail Owner | Application that owns the tail vertex/software component. |
| Update Time | The time at which the edge was last encountered. |

The following elaborates on example edge properties. Referring to FIG. 1, the edge between module A1 and module A2 may be described as follows. The head vertex may be module A2. The tail vertex may be module A1. The edge owner may be managed application A 151A. The head vertex owner may be managed application A 151A. The tail vertex owner may be managed application A 151A.

As another example, the edge between module A3 and web server 109 may be described as follows. The head vertex may be the web server 109. The tail vertex may be module A3. The edge owner, head vertex owner, and tail vertex owner may all be managed application A 151A.

As still another example, the edge between web service 109 and module B1 may be described as follows. The head vertex may be module B1. The tail vertex may be web server 109. The edge owner, head vertex owner, and tail vertex may all be managed application B 151B. In some embodiments, a second set of data may be formed for this edge. The second set may list managed application A 151A as the edge owner and as the tail vertex owner, with managed application A 151A being the head vertex owner. One reason for this second set of data for this edge is to allow for dependency maps 200 to be displayed from perspectives of different applications 151. In this example, the edge information when managed application A 151A was the edge owner might be used when displaying a dependency map 200 from the perspective of application A 151A. Similar reasoning may apply for displaying a dependency map 200 for managed application B 151B.

Note that the agent 112 could assign a special name for some components, such as "external vertex." For example, in the last example, the web service 109 software component might be referred to as an "external vertex." The network 104 (or web browser 102) that sends a request to module A1 might also be called an "external vertex." One reason for this naming convention is that the actual software component that calls an application 151 might not be of interest to the user. Therefore, a more general term such as "external vertex" may provide sufficient detail.

Figure 8:
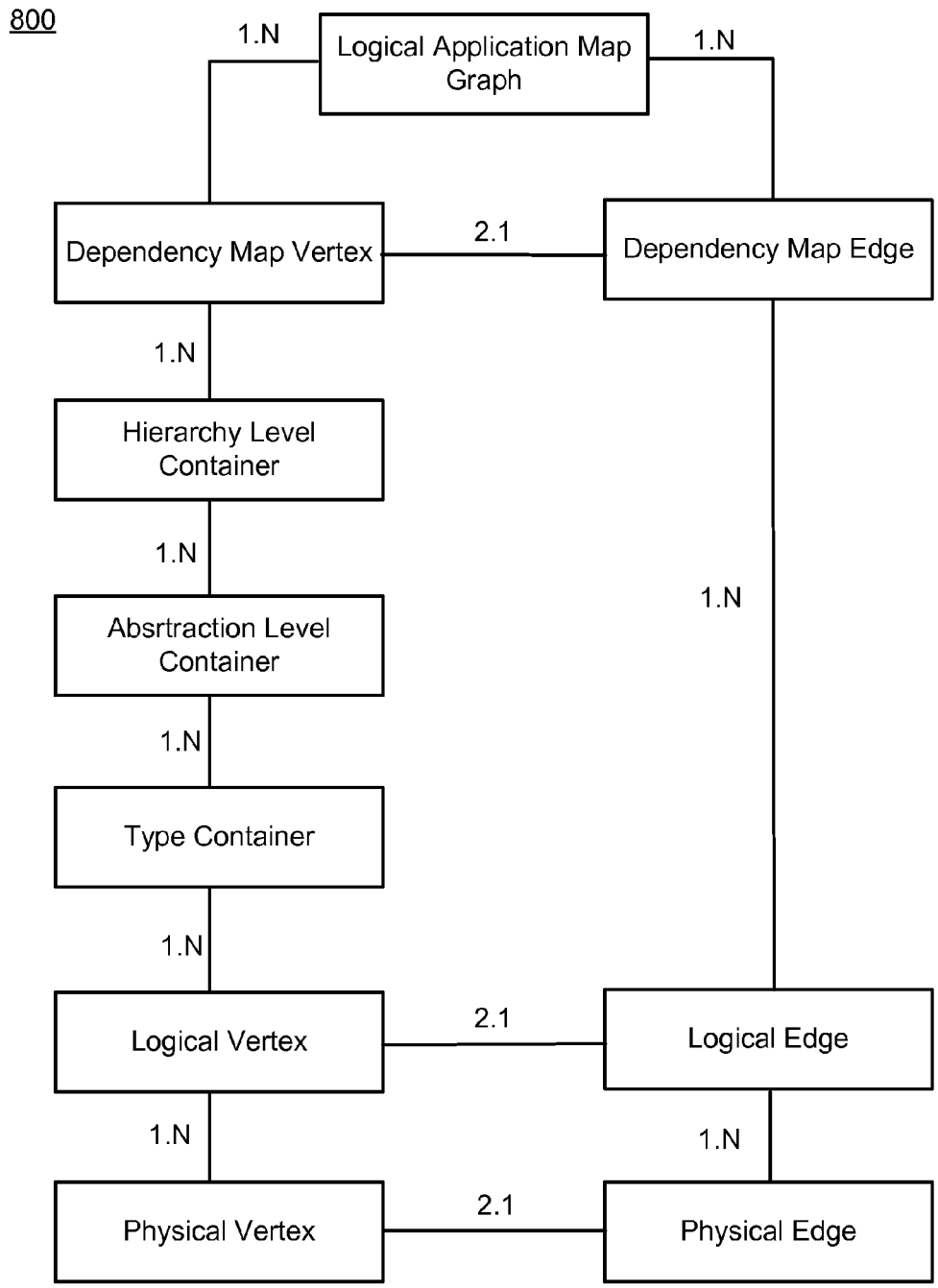
FIG. 8 is a block diagram of one embodiment of a digraph data structure.

FIG. 8 is a block diagram of one embodiment of a digraph data structure 800. The digraph data structure 800 may be formed by Manager 120 based on dependency data collected by Agents 112. A digraph 800 may include of a set of vertices (also called nodes), and a set of edges. Each edge may represent a pair of distinct vertices. The edges in a directed graph may be ordered pairs.

Starting at the bottom of the digraph data structure 800, there is a collection of physical vertices and a collection of physical edges. These may be the actual dependency data collected by agents 112. As indicated, there may be a 2:1 relationship between physical vertices and physical edges (corresponding to the ordered pairs of components for an edge). At the next higher level, there is a collection of logical vertices and a collection of logical edges. In general, there may be one logical vertex for all instances of a particular physical vertex. In general, there may be one logical edge for all instances of a particular physical edge. The may be a 2:1 relationship between logical vertices and logical edges, corresponding to the ordered pairs of components for an edge. As discussed below, the dependency data may be aggregated to form the logical vertices from the physical vertices (raw dependency data). Likewise, the dependency data may be aggregated to form the logical edges from the physical edges. Note that there is a 1:N relationship between logical vertices and physical vertices (similar for logical edges and physical edges).

As noted in Table 1, vertices may have various properties such as, "type," "abstraction level," and "hierarchy level." The next higher levels of the digraph 800 above the logical vertex are containers for these properties. For example, there may be separate type containers for "servlet," "EJB," and/or "database." As another example, there may be separate hierarchy level containers for "Class," and "Class-Method." As another example, vertices may be classified based on "abstraction level." In one embodiment, there is a container for "external vertices," which may be for at least some components that are outside of the application server 110. In one embodiment, components that call the managed application 151 from outside are "external vertices." However, external components at the backend, such as databases, are not required to be considered external vertices. Note that these properties are examples; other properties might be used. Also note that the properties could be located in a different order (e.g., different levels).

The digraph data structure 800 at the highest level includes of a set of Dependency Map Vertices and Dependency Map Edges. The dependency map may be drawn based on the Dependency Map Vertices and Dependency Map Edges. For example, the various elements seen in FIGS. 2-4 may be based on Dependency Map Vertices and Dependency Map Edges.

A Dependency Map Vertex may represent a collection of similar Physical Vertices. The Physical Vertices may be grouped together on the basis of vertex ownership and properties (such as, category, hierarchy level, abstraction level, type and name). A Dependency Map Edge may be an ordered pair of Dependency Map Vertices. Each Dependency Map Edge may maintain the original physical edge relationship by maintaining a collection of Logical Edges.

Figure 9:
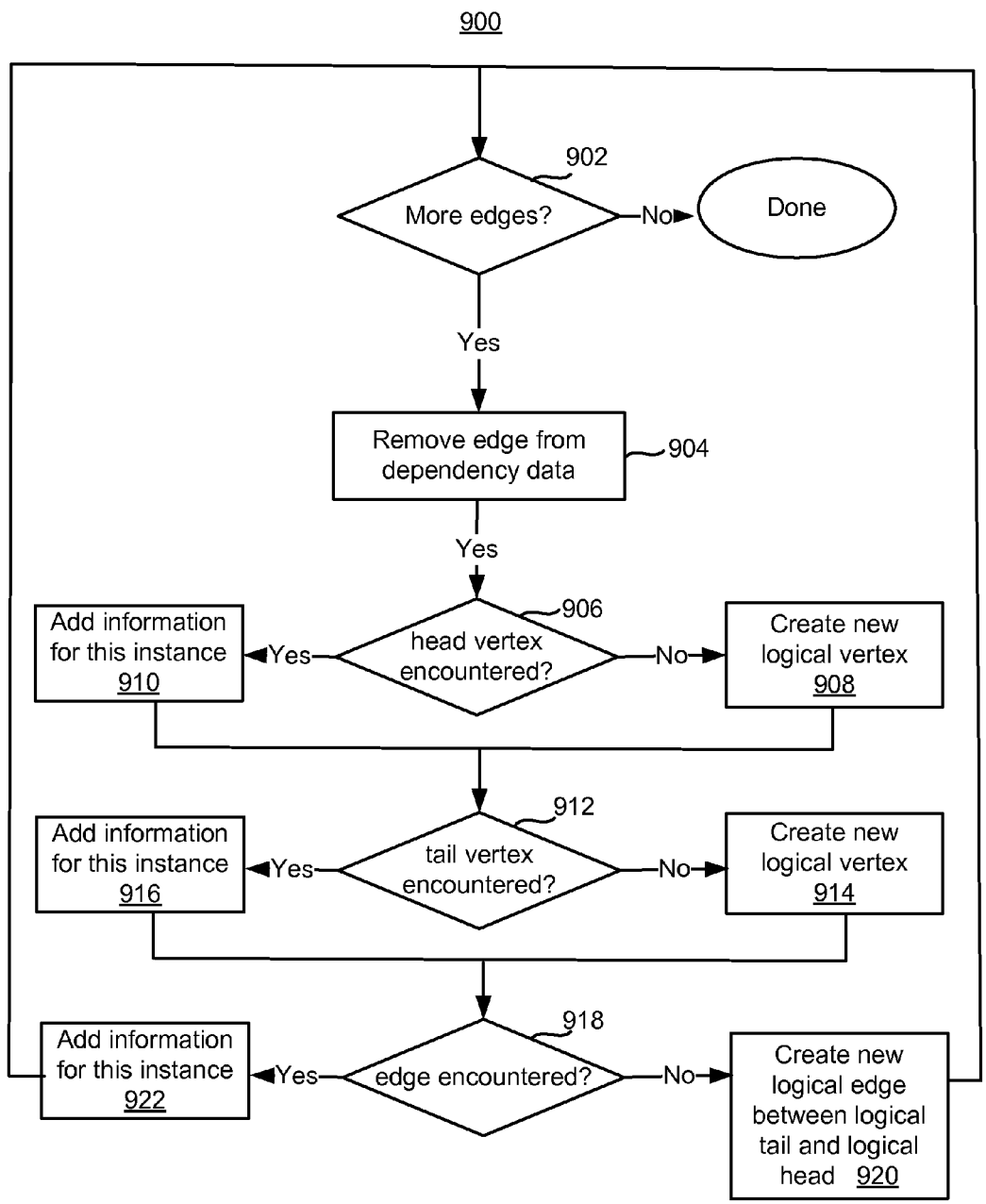
FIG. 9 is a flowchart that depicts one embodiment of processing edges when creating a digraph.

FIG. 9 is a flowchart that depicts one embodiment of a process 900 for processing edges when creating a digraph. Process 900 may be performed by Manager 120; however, another compute node could perform the process 900. In general, the process 900 includes aggregating the dependency data to form a digraph. In process 900, the terms "physical" and "logical" are used. In process 900, the term "physical" refers to the data that is collected. For example, the terms "physical vertex" and "physical edge" are used to refer to data that is collected by the Agents 112. Note that there may be many instances of a given physical vertex in the dependency data. For example, there may be many instances of Module A1 in the dependency data. Likewise, there may be many instances of a given physical edge in the dependency data. In process 900, the term "logical" refers to a node that is created in the digraph to represent the physical vertices and edges. Note that there may be a single logical vertex for all instances of a given physical vertex. For example, there may be a single logical vertex for Module A1. Likewise, there may be a single logical edge for all instances of a given physical edge. Process 900 may be performed in response to a user request. The user may request that the dependency data be shown from the perspective of a certain application or transaction. FIG. 204 showed a few examples of this.

Process 900 may process edges that are owned by the application(s) or transaction(s) that the user specified in the request to display the dependency map 200. In step 902, a determination is made whether there are more physical edges in the dependency data to process. If so, the next physical edge is accessed from the dependency data in step 904. As noted herein, an edge may be described by a head vertex and a tail vertex. In step 906, the Manager 120 determines whether the head vertex has already been encountered. In other words, the Manager 120 may determine whether the digraph already has a logical vertex for the head vertex. If not, then a new logical vertex is created in the digraph for the head vertex in step 908. In one embodiment, the Manager 120 examines one or more of the properties of the head vertex in the dependency data. For example, referring to Table 1, one or more properties such as type, name, owner, hierarchy level, and abstraction level can be compared to logical vertices already in the digraph. Note that these properties are presented as examples.

If the head vertex has already been encountered, then there is no need to create a new logical vertex in the digraph. However, information pertaining to this instance of the head vertex may be added to the digraph in step 910. For example, this instance of the head vertex may have some time information associated with it such as the time the Agent 112 collected the data or the time the Manager 120 received the data containing this instance. This time information could be added to the digraph. One reason for including time information is that in some embodiments, the dependency map is displayed based on the age of the dependency data. For example, the user might be interested in transactions that occurred during a particular time-slice. In one embodiment, the logical vertex has a bucket containing each instance of the head vertex that was encountered. The different instances may be ordered based on the time information.

After processing the head vertex, the tail vertex is processed. Processing of the tail vertex may be similar to the head vertex. In step 912, the Manager 120 determines whether the tail vertex has already been encountered. In other words, the Manager 120 may determine whether the digraph already has a logical vertex for the tail vertex. If not, then a new logical vertex is created in the digraph for the tail vertex in step 914. In one embodiment, the Manager 120 examines one or more of the properties of the tail vertex in the dependency data. If the tail vertex has already been encountered, then there is no need to create a new logical vertex in the digraph. However, information pertaining to this instance of the tail vertex may be added to the digraph in step 916. In one embodiment, the logical vertex has a bucket containing each instance of the tail vertex that was encountered. The different instances may be ordered based on time information.

After processing the tail vertex, the edge is processed. In step 918, the Manager 120 determines whether the edge has already been encountered. In other words, the Manager 120 may determine whether the digraph already has a logical edge for the edge. As mentioned herein, an edge may be described by an ordered pair of a tail vertex and head vertex. In one embodiment, the Manager 120 examines properties of the edge to determine whether an edge with the properties of the head and tail vertex has been encountered. However, a different technique could be used to look for edge equality.

If the edge has not been encountered, then a new logical edge is created in the digraph for the edge in step 920. This logical edge is created between the logical had and logical tail. If the edge has already been encountered, then there is no need to create a new logical edge in the digraph. However, information pertaining to this instance of the edge may be added to the digraph in step 922. For example, time information associated with the edge may be added. In one embodiment, the logical edge has a bucket containing each instance of the edge that was encountered. The different instances may be ordered based on time information. In one embodiment, the edges that are stored are sorted based on the owning agent.

Figure 10A:
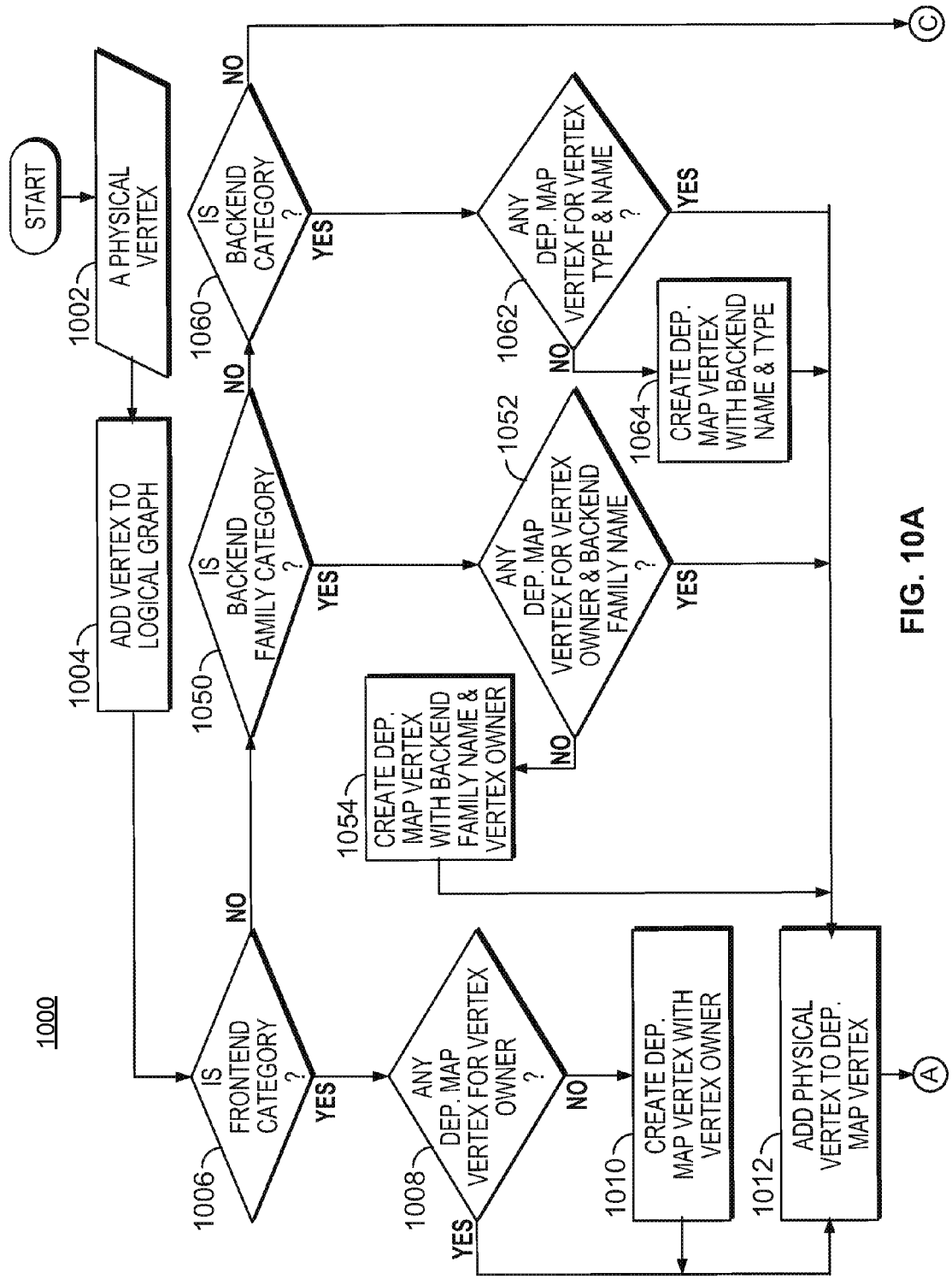
FIGS. 10A and 10B depict a flowchart of one embodiment of processing vertices when creating a digraph.
Figure 10B:
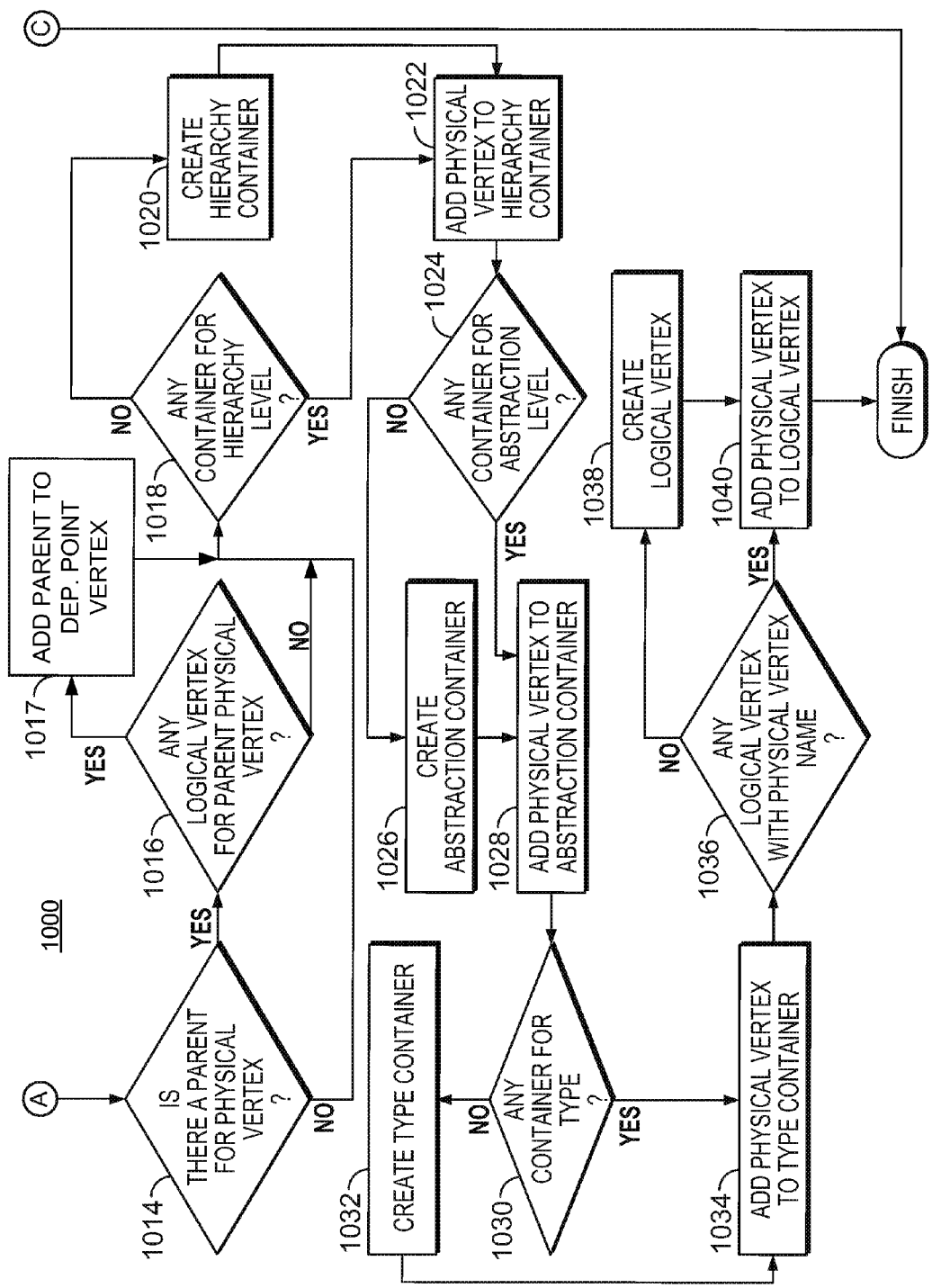

FIGS. 10A and 10B depict a flowchart of one embodiment of a process 1000 of processing vertices when forming a digraph. Recall that in some embodiments, a logical vertex may have properties such as type, abstraction level, hierarchy, etc. Process 1000 describes details of adding these properties to the digraph data structure 800. In general, process 1000 describes processing a single vertex. Thus, process 1000 may be repeated for each vertex (both tail and head). Process 1000 may be performed by Manager 120; however, another node could perform process 1000.

In step 1002, the Manager 120 accesses a physical vertex from the dependency data. In step 1004, the physical vertex is added to the logical digraph 800.

In process 1000, vertices may be categorized as "frontend," "backend," and "backend family category." Processing may continue based on which the categories the physical vertex is in. A frontend may in general refer to a component at or near the start (or front) of a transaction. For example, module A1 may be a frontend for transaction BTA1 (see FIG. 1). A backend may in general refer to a component at or near the back of a transaction. In one embodiment, backend is divided into two categories, depending on the availability of performance metrics. For example, when module A2 calls database X 113, there might be performance metrics for the call. Therefore, database X 133 might be called a "backend category." On the other hand, when module A3 calls web service 109, which calls module B1, there might be performance metrics for the call to the web service 109, but not for the call to module B1. Therefore, web service 109 might be called a "backend family category."

Step 1006 is a test to determine if the physical vertex is in the frontend category. One factor that may be used to determine which category a component belongs in is to consult a list. For example, the list might specify that certain types of software components may be considered "frontend." For example, a servlet might be considered a frontend. A database might be considered to be a backend. Other properties could also be used to determine the category. In one embodiment, user can define the category for various components. Assuming the physical vertex is in the frontend category, the Manager 120 determines whether there is a dependency map vertex for the physical vertex owner. If not, a dependency map vertex is created in step 1010. Then, the physical vertex is added to the dependency map vertex in step 1012. If a dependency map vertex already exists for the physical vertex owner, then step 1010 may be skipped.

In step 1014 the Manager 120 determines whether there is a parent for the physical vertex. Recall the one property of a vertex may be hierarchy level (e.g., Class, Class-Method). The hierarchy level may be examined to determine whether there is a parent that already exists in the directed graph. If there is a parent, then the Manager 120 determines whether there is any logical vertex for the parent physical vertex in step 1016. If there is not a logical vertex for the parent physical vertex (step 1016 is no), then the parent vertex is added to the dependency map vertex in step 1017. If step 1016 is yes, then the process continues with step 1018 to be discussed below.

If there is not a parent for the physical vertex (step 1014 is no), then the Manager determines whether there is any container for the hierarchy level of the physical vertex, in step 1018. If there is not, then Manager 120 creates a hierarchy container (step 1020) and adds the physical vertex to the hierarchy container (step 1022). On the other hand, if a container already exists for the hierarchy level of the physical vertex, then a new container does not need to be created (step 1020 skipped) and the physical vertex is added to the already existing hierarchy container in step 1022.

Next processing of the abstraction level is performed. The Manager 120 determines whether there is any container for the abstraction level of the physical vertex, in step 1024. If there is not, then Manager 120 creates an abstraction level container (step 1026) and adds the physical vertex to the abstraction level (step 1028). On the other hand, if a container already exists for the abstraction level of the physical vertex, then a new container does not need to be created (step 1026 skipped) and the physical vertex is added to the already existing abstraction level container in step 1028.

Next processing of the type is performed. The Manager 120 determines whether there is any container for the type of the physical vertex, in step 1030. If there is not, then Manager 120 creates a type container (step 1032) and adds the physical vertex to the type container (step 1034). On the other hand, if a container already exists for the type of the physical vertex, then a new container does not need to be created (step 1032 skipped) and the physical vertex is added to the already existing type container in step 1034.

Next processing of the logical vertex is performed. The Manager 120 determines whether there is any logical vertex with the physical vertex name, in step 1036. If there is not, then Manager 120 creates a logical vertex (step 1038) and adds the physical vertex to the logical vertex (step 1040). On the other hand, if a logical vertex already exists for the physical vertex, then a new logical vertex does not need to be created (step 1038 skipped) and the physical vertex is added to the already existing logical vertex in step 1040. This concludes processing for the case in which the physical vertex is in the frontend category.

If the physical vertex is in the backend family category (step 1050 is yes), then processing is as follows. The Manager 120 determines whether there is already a dependency map vertex for the vertex owner and backend family name (step 1052). If not, the Manager 120 creates such a dependency map vertex in step 1054. Then, process 1000 adds the physical vertex to the dependency map vertex in step 1012. If the dependency map vertex already exists, then process 1000 goes to step 1012 to add the physical vertex to the dependency map vertex. Process 1000 then continues on as already described for the frontend category.

If the physical vertex is not in the backend family category (step 1050 is no), then the Manager 120 determines whether the physical vertex is in the backend category (step 1060). If so, then Manager 120 determines whether there is already a dependency map vertex for the vertex type and name (step 1062). If not, the Manager 120 creates such a dependency map vertex in step 1064. Then, process 1000 adds the physical vertex to the dependency map vertex in step 1012. If the dependency map vertex already exists, then process 1000 goes to step 1012 to add the physical vertex to the dependency map vertex. Process 1000 then continues on as already described for the frontend category. If the physical vertex is not in the backend category (step 1060 is no), then the process finishes.

Figure 11:
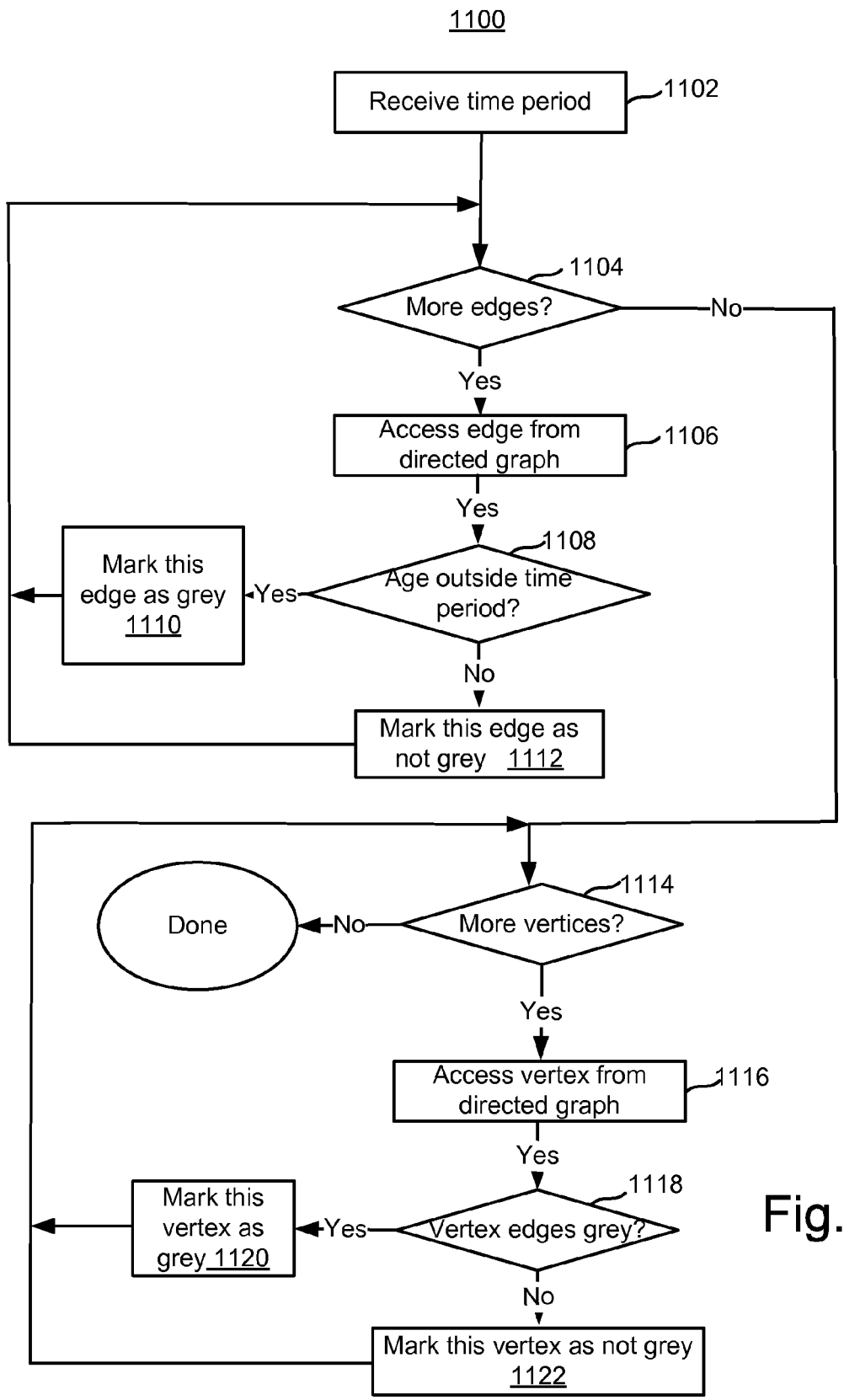
FIG. 11 is a flowchart that depicts one embodiment of a process for modifying a digraph for displaying based on age of dependency data.

In one embodiment, the dependency map 200 is displayed based on the age of the dependency data. For example, some of the components and/or edges in the dependency map could be grayed out if the data for a component and/or edge is outside of a user-specified time range. FIG. 11 is a flowchart of one embodiment of a process 1100 of displaying a dependency map based on the age of dependency data. In one embodiment of process 1100, a directed graph is an input and a directed graph having certain vertices and/or edges marked as aged is the output.

In step 1102 a time range is received. In one embodiment, a user enters a time range into a user interface, such as user interface 122. The user might also specify one or more managed applications 151 and/or one or more transactions for which the dependency data is to be formed.

In general, process 1100 processes edges and vertices from an input directed graph. In step 1104, a determination is made whether there are more edges to be processed. If so, the next edge is accessed from the directed graph in step 1106. For example, time information that was stored in the directed graph is accessed. Recall that the time information might include the time that the agent 112 collected data for a physical edge and/or the time the manager 120 stored the dependency data. However, note that the time information is not limited to these examples.

In step 1108, a determination is made whether the age of the edge is outside of the time period that was received in step 1102. For example, if the user only wants to see data for the last 24 hours, then if the data for the edge was collected more than 24 hours ago, it is marked as grey in step 1110. Marking as grey refers to marking the edge such that when the dependency map is displayed, that edge is displayed as grayed out. Note that marking as grey is one example of marking the edge as aged; other techniques could be used. Otherwise, the edge is marked as not gray in step 1112. Process 1110 continues to process more edges until all edges have been processed. Then, vertices are processed beginning at step 1114.

In step 1114, a determination is made whether there are any more vertices in the directed graph. If so, then the next vertex is accessed from the directed graph. For example, information about the vertex is accessed from the directed graph such that a determination can be made whether to grey the vertex. In one embodiment, the determination is based on whether edges connected to the vertex are grayed.

In step 1118, a determination is made as to whether all of the edges connected to the vertex are marked as grey. If so, then the vertex is marked as grey in step 1120. Otherwise, the vertex is marked as not grey in step 1122. Note that a different test could be made for determining whether to mark the vertex as grey. After all vertices have been processed, process 100 concludes. The result of process 1110 may be a directed graph that has edges and vertices annotated as either grey/not grey. Therefore, the dependency may be displayed appropriately. As mentioned, graying out is one example of marking in a way to show aging of dependency data.

One embodiment disclosed herein includes a machine-implemented method for displaying a dependency map on a display screen. The method may include collecting data that describes dependencies between a plurality of software components as the software components process transactions; aggregating the data to form a directed graph that represents dependencies between the plurality of software components as the software components process transactions; and displaying a dependency map on a display screen based on the directed graph, the dependency map shows dependencies as the transactions are processed.

One embodiment disclosed herein includes a system having one or more processors, and computer readable storage coupled to the one or more processors. The computer readable storage may have computer readable instructions stored thereon which, when executed on the one or more processors, cause the one or more processors to begin traces of transactions that are processed by software components in the system; collect data that describes dependencies between the software components as the transactions are processed; aggregate the data that describes dependencies to form a directed graph that represents dependencies between the software components as the transactions are processed; and display a dependency map based on the directed graph that describes dependencies of either the software components or applications in which the software components reside as the transactions are processed.

One embodiment disclosed herein includes computer readable storage having computer readable instructions stored thereon for programming at least one processor to perform a method comprising: collecting data that describes dependencies between a plurality of software components as the software components process transactions; aggregating the data to form a directed graph that represents dependencies between the plurality of software components as the software components process the transactions; and displaying a dependency map on a display screen based on the directed graph, the dependency map shows dependencies of either a set of the software components or applications in which the plurality of software components reside as the transactions are processed.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A machine-implemented method comprising:
   collecting dependency data that describes dependencies between a plurality of software components as the software components process transactions, comprising collecting edge data for a plurality of edges, each edge is associated with a pair of the plurality of software components, the edge data identifies either a software application that owns the edge or a type of transaction that owns the edge;
   aggregating the dependency data to form a directed graph that represents dependencies between the plurality of software components as the software components process transactions, comprising processing edges of the plurality of edges that either are owned by a first software application or owned by a first type of transaction; and
   displaying a dependency map for either the first software application or the first type of transaction on a display screen based on the directed graph, the dependency map shows dependencies as the transactions are processed.

2. The machine-implemented method of claim 1, wherein the collecting data further comprises collecting vertex data for a plurality of vertices, each vertex is associated with a software component of the plurality of software components.

3. The method of claim 2, wherein the aggregating the dependency data to form a directed graph that represents dependencies between the plurality of software components as the software components process transactions comprises:
   creating a first logical edge for a first instance of a first of the edges in the dependency data; and
   adding information to the first logical edge for additional instances of the first edge in the dependency data.

4. The method of claim 3, wherein the aggregating the dependency data to form a directed graph that represents dependencies between the plurality of software components as the software components process transactions further comprises:
creating a first logical vertex for a first instance of a first of the software components in the dependency data; and
adding information to the first logical vertex for additional instances of the first software component in the dependency data.

5. The machine-implemented method of claim 1, wherein the aggregating the data to form a directed graph comprises creating a single logical edge for different instances of the same edge in the dependency data, and repeating for additional edges in the edge data to create a plurality of logical edges.

6. The machine-implemented method of claim 5, wherein the aggregating the data to form a directed graph comprises creating a single logical vertex for different instances of the same software component in the dependency data, and repeating for additional vertices in the vertex data to create a plurality of logical vertices.

7. The machine-implemented method of claim 6, wherein the displaying a dependency map on a display screen based on the directed graph comprises displaying a first of the logical edges in a way that indicates that it is aged.

8. The machine-implemented method of claim 6, wherein the displaying a dependency map on a display screen based on the directed graph comprises displaying a first of the logical vertices in a way that indicates that it is aged.

9. The machine-implemented method of claim 1, wherein the dependency map shows dependencies between applications that comprise the plurality of software components.

10. The method of claim 1, further comprising:
receiving a user request for a dependency map that pertains to transactions among the transactions processed by the software components that are processed by the first software application, the processing edges of the plurality of edges comprises processes edges that are owned by the first software application, the displaying a dependency map comprises displaying a dependency map that pertains to the transactions processed by the first software application.

11. The method of claim 1, further comprising:
receiving a user request for a dependency map that is directed to the first type of transaction, the displaying a dependency map comprises displaying a dependency map that is directed to the first type of transaction.

12. The method of claim 11, wherein the aggregating the dependency data to form a directed graph that represents dependencies between the plurality of software components as the software components process transactions comprises processing edges of the plurality of edges that are owned by the first type of transaction.

13. A system comprising:
a processor configured to:
begin traces of transactions that are processed by a plurality of software components in the system;
receive a request for a dependency map that pertains to either transactions being traced that are processed by a specified software application or that is directed to a specified type of transaction among the transactions being traced;
collect dependency data that describes dependencies between the software components as the transactions are processed, comprising the processor being configured to collect edge data for a plurality of edges, each edge is associated with a pair of the plurality of software components, the edge data identifies either a software application that owns the edge or a type of transaction that owns the edge;
aggregate the dependency data that describes dependencies to form a directed graph that represents dependencies between the software components as the transactions are processed, comprising the processor being configured to process edges of the plurality of edges that are owned by either the specified software application or owned by the specified type of transaction; and
display a dependency map for either the specified software application or the specified type of transaction based on the directed graph that describes dependencies of either the software components or applications in which the software components reside as the transactions are processed.

14. The system of claim 13, wherein the collected dependency data comprises vertex data that describes the plurality of software components and the edge data.

15. The system of claim 14, wherein the processor being configured to aggregate the dependency data to form a directed graph comprises the processor being configured to:
create a first logical edge for a first instance of a first of the edges in the dependency data; and
add information to the first logical edge for additional instances of the first edge in the dependency data.

16. The system of claim 15, wherein the processor being configured to aggregate the data to form a directed graph comprises processor being configured to:
create a first logical vertex for a first instance of a first of the software components in the dependency data; and
add information to the first logical vertex for additional instances of the first software component in the dependency data.

17. The system of claim 16, wherein the processor is further configured to receive a time period, wherein the processor being configured to display a dependency map on a display screen based on the directed graph comprises the processor being configured to display a first of the logical edges in a way that indicates that it represents a dependency that occurred outside of the time period.

18. The system of claim 16, wherein the processor is configured to receive a time period, wherein the processor being configured to display a dependency map on a display screen based on the directed graph comprises the processor being configured to display the first software component in a way that indicates that the data upon which it is based was collected outside of the time period.

19. The system of claim 13, wherein the dependency map shows dependencies between software applications that comprise the plurality of software components.

20. The system of claim 13, wherein the dependency map shows dependencies between at least some of the plurality of software components.

21. The system of claim 13, wherein the processor being configured to aggregate the dependency data comprises the processor being configured to process edges of the plurality of edges that are owned by the specified type of transaction, the processor being configured to display a dependency map comprises the processor being configured to display a dependency map directed to the specified type of transaction based on the directed graph.

22. Computer readable storage having computer readable instructions stored thereon for programming a processor to:
collect dependency data that describes dependencies between a plurality of software components as the software components process transactions, the software components are associated with a plurality of software applications, comprising the processor being programmed to collect edge data for a plurality of edges, each edge is associated with a pair of the plurality of software components, the edge data identifies either a software application of the plurality of software applications that owns the edge or a type of transaction of the transactions processed by the software components that owns the edge;

aggregate the dependency data to form a directed graph that represents dependencies between the plurality of software components as the software components process the transactions, comprising the processor being programmed to process edges of the plurality of edges that are owned by either a first software application of the plurality of software applications or owned by a first type of transaction of the transactions processed by the software components; and display a dependency map for either the first software application or the first type of transaction on a display screen based on the directed graph, the dependency map shows dependencies of either a set of the software components or applications in which the plurality of software components reside as the transactions are processed.

23. The computer readable storage of claim 22, wherein the instructions that program the processor to collect dependency data comprise one or more agents collecting vertex data that describes the plurality of software components and edge data for a plurality of edges, each edge is associated with a pair of the plurality of software components.

24. The computer readable storage of claim 23, wherein the instructions that cause the processor to aggregate the data to form a directed graph comprise instructions that cause the processor to:

create a first logical edge for a first instance of a first of the edges in the dependency data; and include timing information to the first logical edge for additional instances of the first edge in the dependency data.

25. The computer readable storage of claim 24, wherein the instructions that cause the processor to aggregate the data to form a directed graph comprise instructions that cause the processor to:

create a first logical vertex for a first instance of a first of the software components in the dependency data; and include timing information to the first logical vertex for additional instances of the first software component in the dependency data.

26. The computer readable storage of claim 25, further comprising instructions that cause the processor to receive a time period, wherein the instructions that cause the processor to display a dependency map comprise instructions that cause the processor to display the dependency map based on the timing information for the logical vertices and logical edges.

* * * * *